United States Patent
Hewitt et al.

(10) Patent No.: US 6,895,853 B1
(45) Date of Patent: May 24, 2005

(54) TANDEM BRAKE BOOSTER

(75) Inventors: Wayne Hewitt, La Porte, IN (US); Joseph M Whicker, Elkhart, IN (US); Richard Straw, Jones, MI (US); Ryan Hurlbutt, Niles, MI (US)

(73) Assignee: Robert Bosch Corporation, Broadview, IL (US)

(*) Notice: Subject to any disclaimer, the term of this patent is extended or adjusted under 35 U.S.C. 154(b) by 34 days.

(21) Appl. No.: 10/605,847

(22) Filed: Oct. 30, 2003

(51) Int. Cl.[7] ............................................. F01B 19/00
(52) U.S. Cl. ........................................................ 92/48
(58) Field of Search ................... 92/48, 97; 91/376 R

(56) References Cited

U.S. PATENT DOCUMENTS

| | | | |
|---|---|---|---|
| 3,083,698 A | 4/1963 | Price | |
| 3,517,588 A | 6/1970 | Kytta | |
| 3,603,208 A * | 9/1971 | Kytta | 92/48 |
| 3,760,693 A | 9/1973 | Myers | |
| 3,958,497 A | 5/1976 | Gardner | |
| 4,596,178 A | 6/1986 | Sugiura | |
| 4,881,451 A * | 11/1989 | Newhouse | 92/48 |
| 5,507,216 A | 4/1996 | Suwa | |
| 5,664,479 A * | 9/1997 | Miwa | 92/48 |
| 5,941,610 A * | 8/1999 | Hayashi et al. | 92/48 |
| 6,626,080 B2 | 9/2003 | Hearr | |

* cited by examiner

Primary Examiner—Thomas E. Lazo
(74) Attorney, Agent, or Firm—Leo H. McCormick, Jr.; Warren Comstock

(57) ABSTRACT

A tandem brake booster has a housing defined by a front shell that is joined to a rear shell to create an interior cavity. The interior cavity is divided by first and second diaphragm assemblies that are separated by a partition member to respectively isolate a first chamber from a second chamber and a third chamber from a fourth chamber. The first and third chambers are connected to fluid having a substantially constantly first pressure while the second and fourth chambers are connected to selectively receive the fluid at the first pressure or fluid at a second pressure. The partition member is characterized by a disc with a cylindrical body extending from a ledge formed on a peripheral surface of the disc and a flange located on the cylindrical body between the ledge and an end face of the cylindrical body.

10 Claims, 3 Drawing Sheets

TANDEM BRAKE BOOSTER

BACKGROUND OF INVENTION

This invention relates to a partition member for dividing an internal cavity within a housing of a brake booster into a plurality of operational chambers wherein the partition member is fixed within the internal cavity and as a result the size of a flow path between a portion of the chamber is substantially un-effected during a brake application.

In the development of brake boosters it became evident that by dividing the interior cavity of a housing by two diaphragm members a resultant output force could be significantly increased. In some of the resulting tandem brake boosters the communication between the chambers is achieved through passages in a hub that retains a control valve that is responsive to an operator input while in other tandem brake boosters such as disclosed in U.S. Pat. Nos. 3,083,698; 3,517,588 and 3,760,693 wherein the rear chambers are connected to each other through flow path created between a peripheral surface of a partition member and housing. The partition member is usually made of a plastic material and connected to the two diaphragm members. In some of such boosters, the partition member may move or float within the interior cavity as a function of a pressure differential developed during a brake application. This floating movement may adversely effect the ultimate development of an output force by a brake booster.

SUMMARY OF INVENTION

It is a primary object of this invention to provide a brake booster with a partition member that is located in a fixed location within interior cavity of a housing to separate first and second chambers from second and third chambers while defining a flow path between various chambers within the interior cavity.

In more particular detail, the brake booster according to the present invention has a housing that is formed by a front shell that is joined to a rear shell to create an interior cavity. The interior cavity is divided by a first diaphragm assembly into first and second chambers and by a second diaphragm assembly into third and fourth chambers with the second and third chamber are separated from each other by a partition member. The first and third chambers are connected to each other and constantly receive a fluid having a first pressure (vacuum) while the second and fourth chambers are connected to receive the fluid having the first pressure (vacuum) or fluid having a second pressure (atmospheric pressure). A valve located in a hub of the second diaphragm assembly selectively controls the communication of fluid at the second pressures to the second and fourth chambers to create a pressure differential across the first and second diaphragm assemblies with the first fluid in the first and third chambers to develop an output force. The output force acts on a master cylinder to pressurize fluid and effect a brake application. The partition member is characterized by a disc with a cylindrical body that extends from a ledge formed on a peripheral surface and a flange located on the cylindrical body between the ledge and an end face of the cylindrical body. The flange is formed with alternate radial sections and ramped sections such that when the front shell is joined with the rear shell a bead on the first diaphragm assembly is compressed between the ledge and the first shell to define a reaction force that acts on and urges the radial sections into engagement with said rear shell to fix the location of the partition member within the interior cavity while the ramped sections define a portion of an unrestricted flow path for communication of fluid between the second and fourth chambers.

An advantage of this invention resides in a partition member that axially fixes first and second diaphragm assemblies within an internal cavity of a housing to create the first, second, third and fourth chambers therein.

It is an object of this invention to axially fix a partition member within a housing by urging a flange on the partition member into engagement with a rear shell through a reaction force developed by compressing a bead on a first diaphragm between the rear shell and a front shell of the housing.

It is an object of this invention to provide a tandem brake booster with a partition member whereby unrestricted fluid communication between the rear chambers occurs through a flow path located between a peripheral surface on the partition and the rear shell.

DETAILED DESCRIPTION

Figure 1:
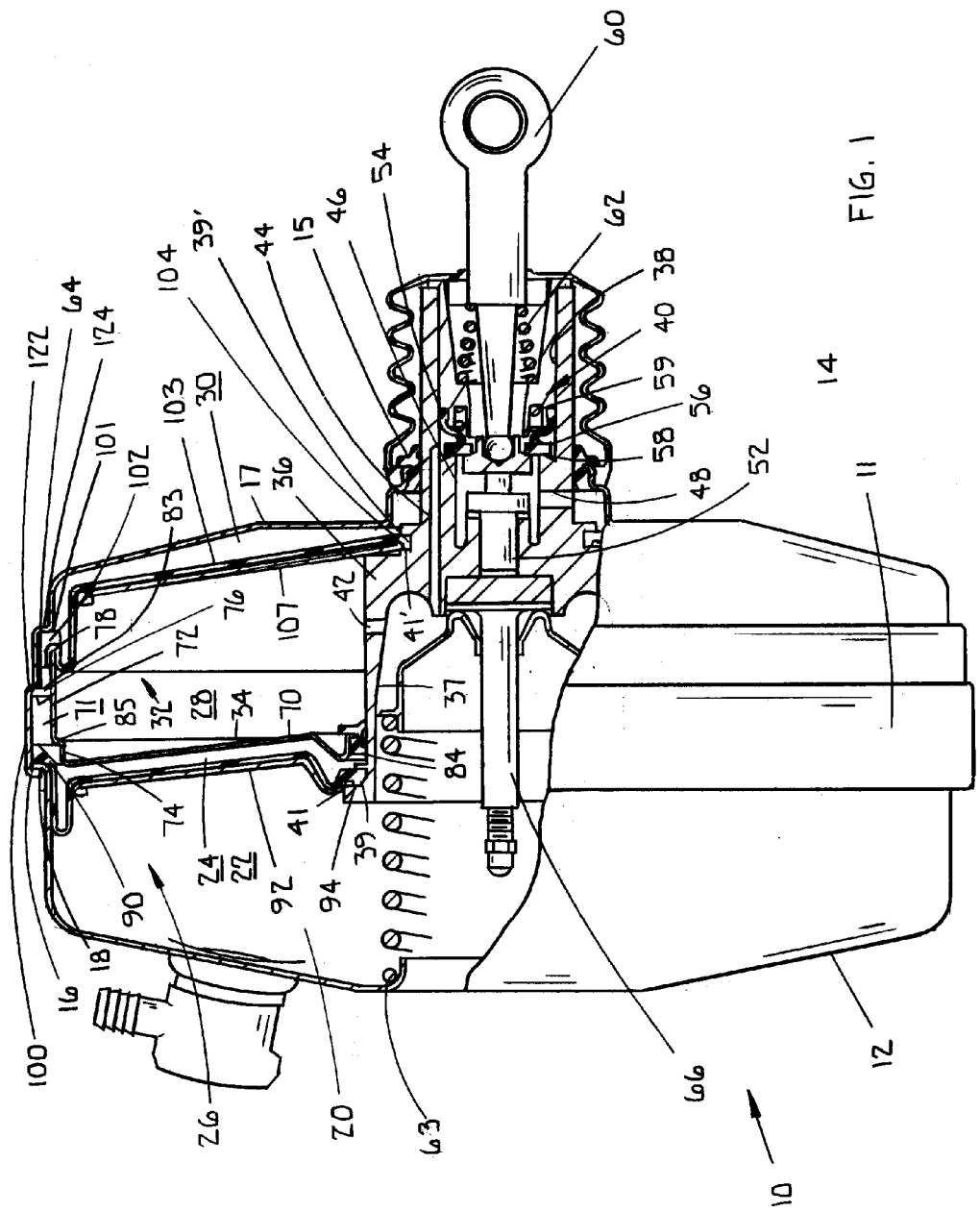
FIG. 1 is a schematic illustration of a brake booster having a partition member made according to the present invention.

A tandem brake booster 10 illustrated in FIG. 1 is made according to the present invention and is defined by a housing 11. Housing 11 is constructed of a front shell 12 that is joined to a rear shell 14 by rolling a lip 16 on the rear shell 14 over an annular flange 18 on the front shell 12 to create a unitary structure of a type illustrated in U.S. Pat. No. 6,390,567. In joining the front shell 12 to the rear shell 14, an interior cavity 20 is created that is separated into a first chamber 22 and a second chamber 24 by a first diaphragm assembly 26 and into a third chamber 28 and a fourth chamber 30 by a second diaphragm assembly 32. The second chamber 24 is separated from the third chamber 28 by a partition member 34 that engages the rear shell 14 and a hub 36 that extends through the first 26 and second 32 diaphragm assemblies. The hub 36 has a stepped internal bore 38 that receives a control valve 40 that is connected to a brake pedal. The hub 36 has a radial opening 42 therein through which bore 38 connects the first chamber 22 to the third chamber 28, a passage 44 through which the first chamber 22 is connected to an annular vacuum seat 46 in bore 38, a passage 48 through which the bore 38 adjacent the vacuum seat 44 is connected to the fourth chamber 30. The control valve 40 that is located in bore 38 includes a plunger 52 and a poppet member 54. The poppet member 54 has a first end that is fixed to the hub 36 and a flexible annular face 56 that is urged toward valve seat 46 by a first spring 59 retained on a push rod 60 connected to the brake pedal, in addition, a second spring 62 acts on the push rod 60 to urge the plunger 52 toward an atmospheric seat 58 on face 56 of the poppet member 54.

In response to an input force applied by an operator to brake pedal, push rod 60 moves such that spring 59 urges face 56 into engagement with vacuum seat 46 to interrupt normally opened communication through passage 44 and thereafter moves plunger 52 away from seat 58 to allow air from the surrounding environment to be communicated from bore 38 to passage 48 for initial distribution to chamber 30 and thereafter by way of flow path 64 formed adjacent the peripheral of the interior cavity 20 to chamber 24. The air supplied to chambers 30 and 24 creates a pressure differential with vacuum available in chambers 22 and 28 such that an output force is created across the first 26 and second 32 diaphragm assemblies. This output force is carried through the first 26 and second 32 diaphragm assemblies into hub 36 and after overcoming return spring 63 provides push rod 66 with an operational force to pressurize fluid in a master cylinder (not shown) to effect a brake application.

Figure 2:
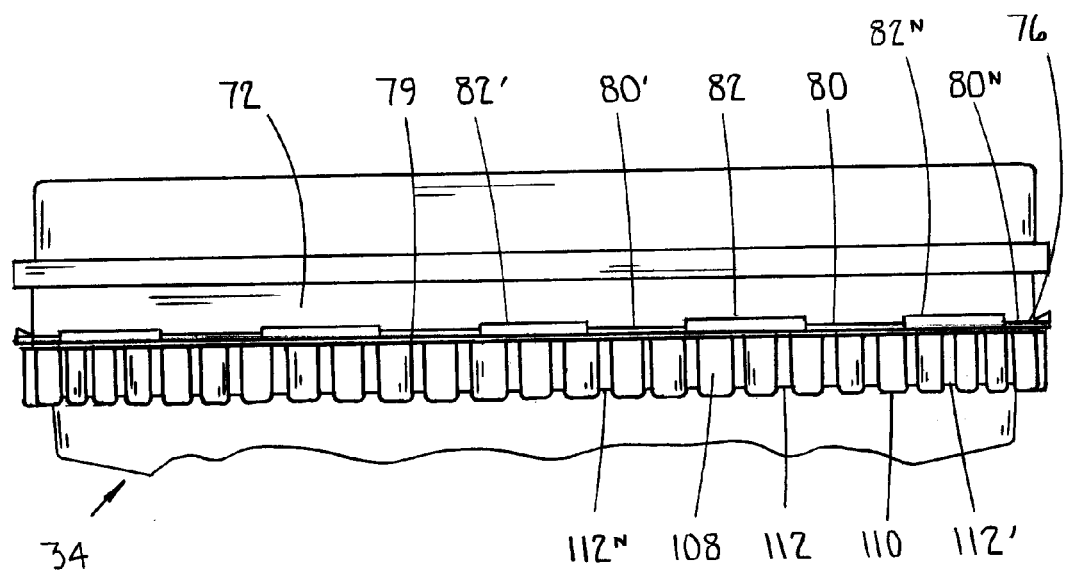
FIG. 2 is a side plan view of the partition member of FIG. 1.
Figure 3:
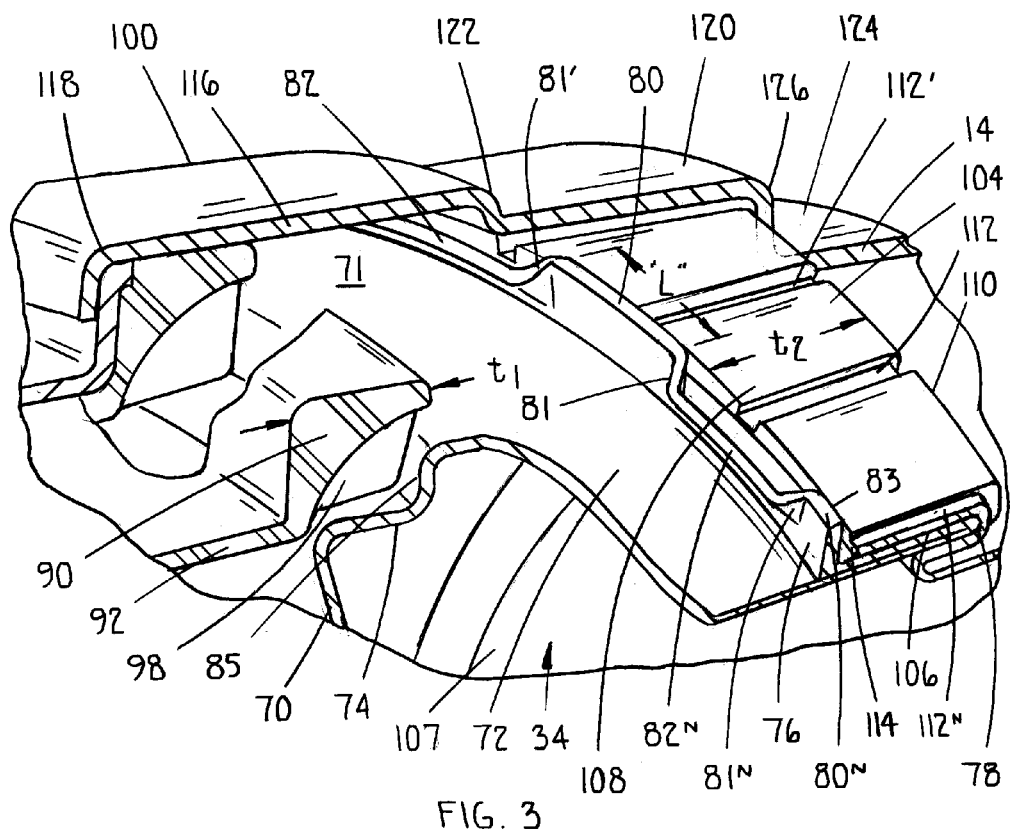
FIG. 3 is an enlarged front perspective view of a section of the brake booster showing a relationship between beads on first and second diaphragms, the front and rear shell and the partition member of FIG. 1.
Figure 4:
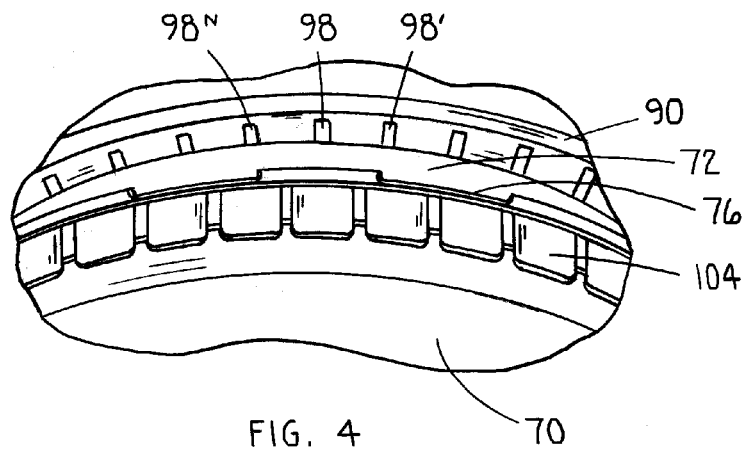
FIG. 4 is an enlarged rear perspective view showing a relationship of the beads of the first and second beads and the partition member of FIG. 3.

In more particular detail, the partition member 34, as best shown in FIGS. 2 and 3, is characterized by a disc 70 with a cylindrical body 72 that extending from a ledge 74 formed on a peripheral surface of the disc 70 and a flange 76 located on the cylindrical body 72 between the ledge 74 and an annular end face 78 of the cylindrical body 72. The flange 76 is formed with alternate radial sections 80, 80" . . . $80^n$ and ramped sections 82, 82" . . . $82^n$. The arcuate length "L" of each radial section 80 is such that when a peripheral surface 81 of radial sections 80 engages the cylindrical body 100 on the rear shell and with seal 84 located on the peripheral surface 37, the hub 36 the axis of bore 38 is a center of the housing 11. The flange 76 is shown as being continuous and provides a smooth flow path for the communication of air between chambers 24 and 30 to attenuate any noise that may occur with a sudden flow of air there between but the partition member 34 could be formed without the radial sections 80, 80" . . . $80^n$ and ramped sections 82, 82" . . . $82^n$ being joined together if a significant reduction in weight could be achieved by eliminating the transition bridges 81, 81" . . . $81^n$. The distance between the face 83 associated with each radial flange 80, 80" . . . $80^n$ and the face 75 of ledge 74 is set and controls the location of the partition member 36 within the interior cavity 20 as a function of a reaction force created by compressing bead 90 of the first diaphragm assembly 26.

The first diaphragm assembly 26 includes a diaphragm 92 with a first bead 90 and a second bead 94 and a backing plate 96. The second bead 94 is located in a first groove 39 on hub 36 to hold backing plate 96 in engagement with shoulder 41 on hub 36 while the first bead 90 is retained on ledge 74 to separate and seal the first chamber 22 from the second chamber 24. Bead 90 has a first thickness "$t_1$" and a first plurality of passages 98, 98" . . . $98^n$ that form a flow path through the bead 90 such that when bead 90 is compressed between ledge 74 and radial flange 18 on the front shell 12 air may freely flow in flow path 64.

The second diaphragm assembly 30 includes a diaphragm 103 with first bead 102 and a second bead 104 and a backing plate 106. The second bead 104 is located in a second groove 39' on the hub 36 to hold backing plate 104 in engagement with shoulder 41' on hub 36. The first bead 102 has a second thickness "$t_2$" with an annular groove 106 that receives the annular end face 78 on cylindrical body 72 of the partition member 36 and annular lip 108 that extends from face 110. Bead 102 has a plurality of slots 112, 112" . . . $112^n$ that extend from face 110 to the end 114 of the annular lip 108 to form a second plurality of passages or channels in flow path 64 for air to flow when the second diaphragm assembly 30 is installed in the rear shell 14.

The rear shell 14 is defined by a generally second cylindrical body 100 that extends from a radial disc 17 through which the hub 36 extends. The cylindrical body 100 has a first diameter section 116 that extends from annular end 118 and is separated from a second diameter section 120 by a first shoulder 122 while the second diameter section 120 is separated from a third diameter section 124 by a second shoulder 126.

The unitary brake booster is manufactured by placing the first diaphragm assembly 26 on hub 36 such that the second bead 94 is located in a first groove 39 to hold backing plate 96 in engagement with shoulder 41. The partition member 34 is added to the hub 36 by locating seal 84 on peripheral surface 37 of hub 36 and bead 90 on ledge 74. The backing plate 104 is placed on hub 36 and bead 104 of the second diaphragm assembly 30 located in groove 39' on the hub 36 to hold backing plate 104 in engagement with shoulder 41' on hub 36. The first bead 102 on the second diaphragm assembly is joined to the partition member 34 by pushing the annular end face 78 on cylindrical body 72 into annular groove 106 such that the annular lip 108 extends toward the flange 76. The length of the annular lip 108 is such that an annular groove 79 is formed between the end of the annular lip 108 and flange 76. When the hub 36 with the first 26 and second 30 diaphragm assemblies attached thereto is placed in the rear shell 14 a portion of the hub extends through opening 15 in the rear shell 14 and face 101 on bead 102 engaging the second shoulder 126 while the peripheral surface 81 of the radial sections 80, 80" . . . $80^n$ on flange 76 engage the first diameter section 116 of the rear shell, the hub 36 is located along the axis of housing 11. The front shell 12 is placed on the rear shell 14 such that flange 18 engages bead 90 and a compressive force is applied to compress bead 90 and bring face 83 on the radial sections 80, 80" . . . $80^n$ on flange 76 into engagement with the first shoulder 122 to fix the position of the partition member 34 within cavity 20. The relatively size of bead 90 as compared with bead 102 is such that the reaction force caused by compression of bead 90 is greater than the reaction force caused by compression of bead 102 and as a result the radial sections 80, 80" . . . $80^n$ on flange 76 are retained in engagement with the first shoulder 122. Thereafter, the annular end 118 is rolled over flange 18 to form the unitary structure.

The flow path 64 between the second chamber 20 and the fourth chamber 30 is defined by the first plurality of passages 98, 98" . . . $98^n$ in bead 90, the annular space 71 between cylindrical body 72 and the first diameter section 116 of cylindrical body 100, the plurality of ramped sections 82, 82" . . . $82^n$ in flange 76, the annular groove 79 defined between the end of lip 108 and flange 76 and the plurality of slots 112, 112" . . . $112^n$ in bead 102. The first plurality of passages 98, 98" . . . $98^n$ in bead 90 and second plurality of passages or slots 112, 112" . . . $112^n$ in bead 102 are uniformly spaced thereon but need not be axially aligned with the plurality of ramped sections 82, 82" . . . $82^n$ in flange 76 as the annular groove 79 and the annular space 71 provide unrestricted communication between the second 20 and the fourth chamber 30.

What is claimed is:

1. In a tandem brake booster having a housing formed by a front shell that is joined to a rear shell to create an interior cavity that is divided by a first diaphragm assembly and a second diaphragm assembly and thereby isolate a first chamber from a second chamber and a third chamber from a fourth chamber, said first and second diaphragm assemblies being separated from each other by a partition member, said first and third chambers being connected to constantly receive a fluid having a first pressure while said second and fourth chambers are selectively connected to receive either the fluid having the first pressure or fluid having a second pressure as a function of the operation of valve means, said valve controls the communication of fluid at said second pressures to said second and fourth chambers to create a pressure differential across said first and second diaphragm assemblies with the first fluid in the first and third chambers to develop an output force and thereby effect a brake application, said partition member being characterized by a disc with a cylindrical body extending from a ledge formed on a peripheral surface of the disc and a flange located on said cylindrical body between said ledge and an end face of the cylindrical body, said flange being formed with alternate radial sections and ramped sections, said radial sections engaging said rear shell to locate said partition member within said interior cavity while said ramped sections define a first portion of a flow path for communication of fluid between said second and fourth chambers.

2. The tandem brake booster as recited in claim 1 wherein said rear shell has a second cylindrical body with a first diameter section that is separated from a second diameter section by a first shoulder and a third diameter section that is separated from the second diameter section by a second shoulder, said radial sections of said flange engage said first shoulder in axially fixing the position of said partition member within said interior cavity.

3. The tandem brake booster as recited in claim 2 wherein said radial sections of said flange engage said first diameter of said rear shell to radially locate said partition member within said interior cavity.

4. The tandem brake booster as recited in claim 3 wherein said first diaphragm assembly is characterized by a first bead having a first thickness and being located on said ledge, said first bead having a first plurality of passages that form a second portion of said flow path between said second and fourth chambers.

5. The tandem brake booster as recited in claim 4 wherein said second diaphragm assembly is characterized by a second bead having a second thickness, a first groove for receiving said end face of said cylindrical body of said partition member and an annular lip that engages said cylindrical body and is concentrically located between said second diameter of said rear shell and said cylindrical body, and a second plurality of passages that form a third portion of said flow path between said second and fourth chambers.

6. The tandem brake booster as recited in claim 5 wherein said annular lip on said second bead extends to a location adjacent said flange such that a space is defined between said flange and an end of said lip to create an annular second groove through which said second plurality of passages are connected with said ramped section of said flange.

7. The tandem brake booster as recited in claim 6 wherein in joining said rear shell to said front shell a closure force is created that compresses said first bead between said ledge and front shell and a first reaction force develops that urges said radial sections of said flange into engagement with said first shoulder on said rear shell and compresses said second bead between said end face of said cylindrical body and said second shoulder on said rear shell to develop a second reaction force in sealing said interior cavity from the surrounding environment.

8. The tandem brake booster as recited in claim 7 wherein said first reaction force is greater than said second reaction force such that said flange on said partition member always remains in contact with said first shoulder.

9. The tandem brake booster as recited in claim 8 wherein a third annular space between said cylindrical body of said partition member and said first diameter of said rear shell define a fourth portion of said flow path.

10. The tandem brake booster as recited in claim 9 wherein said first and second plurality of passages in said first and second diaphragm members are uniformly spaced thereon but need not be axially aligned with said ramp sections on said flange as said annular second groove and said third annular space provide unrestricted communication between said second and fourth chambers.

* * * * *